United States Patent Office 2,750,263
Patented June 12, 1956

2,750,263

APPARATUS FOR THE REDUCTION OF ORGANIC COMPOUNDS BY HYDROGENATION

Vittorio de Nora and Ettore de Bartholomaeis, Milan, Italy, assignors, by direct and mesne assignments, to Oronzio de Nora Impianti Elettrochimici, Milan, Italy, an Italian company Application October 5, 1951, Serial No. 249,878

6 Claims. (Cl. 23—260)

This application is a continuation in part of our application Serial No. 28,604 filed May 22, 1948; now Patent No. 2,597,074.

This invention relates to an improved apparatus and system for the production of higher molecular alcohols and other hydrogenation products by the reaction of hydrogen or gases containing hydrogen with fatty or other organic materials under high pressures and temperatures in the presence of a catalyst. The apparatus and system is particularly adapted for the hydrogenation of mixed fatty acid materials of low and high molecular weight such as are found in natural fats and oils.

The hydrogenation of fatty materials and other organic substances in the presence of catalysts is a common reaction used in a number of industrial operations. The hydrogen gas reacts rapidly at the surface of the catalyst and for each field of application there are conditions of temperature and pressure which are especially favorable. In some fields of use, a combination treatment with hydrogen and carbon monoxide or hydrogen with other gases is employed, as for example, in the process of the patent to Roelen, No. 2,327,066, granted August 17, 1943.

In the hydrogenation of fatty acids or fatty acid esters or glycerides or other carboxylic acid materials, the hydrogen reacts at the carboxylic group, yielding a corresponding alcohol or mixture of alcohols. Likewise, the treatment of olefines with both hydrogen and carbon monoxide together yields alcohols. Double bonds in raw material can be hydrogenated at the same time the carboxylic group is converted, but the reaction can be made to proceed in such a way that the double bonds remain unchanged.

Broadly considered, the invention is applicable in general to the treatment of any materials heretofore capable of being reduced by known hydrogenation processes under elevated temperatures and pressures. Examples of raw material which may be reduced by the present apparatus and system include coconut oil, palm kernel oil, spermaceti, sperm oil, beeswax, linseed oil, cottonseed oil, tallow, stearin, olein, colophony and any carboxylic acid or mixtures of the same derived therefrom. Carboxylic acids from other sources may also be treated, as for example, naphthenic acids. Other processes to which the apparatus and system is applicable include the reaction of petroleum derivatives or fractions from the Fischer-Tropsch process. Each of the above reduction reactions is carried out in an autoclave in which temperature and hydrogen pressure conditions are maintained at predetermined desirable levels. According to present industrial practice, when the reaction in the autoclave is complete, the final product containing the catalyst distributed therethrough is discharged and fresh raw material is charged into the autoclave together with its catalyst, whereupon fresh hydrogen or hydrogen mixed with other gases is introduced.

The various operations as now practiced are a drawback to the industrial application of hydrogenation, because the autoclave is charged and discharged in each operation and the hydrogen pressure and temperature within the autoclave must be brought back to that required for the reaction. Attempts have been made to operate the process continuously, but the complications of continuous hydrogenation have not made the continuous process economical, and such process sometimes gives origin to products which are not uniform, due to the difficulty in controlling the operation and the activity of the catalyst.

We have now provided a new apparatus and system for catalytic hydrogenations, by which it is possible not only to obtain a rapid repetition of the batch hydrogenation process but also to have the hydrogenation reaction take place more rapidly and uniformly in a continuous manner. This substantial advantage has been accomplished by maintaining the reaction autoclave always under operating conditions of hydrogen pressure and temperature, and by charging the raw material and discharging the products without changing appreciably the pressure or the temperature in the autoclave.

A further improvement has been realized by providing for a continuous hydrogen circulation under hydrogenation pressure through the reaction autoclave during the hydrogenation process. This step accomplishes not only stirring and mixing of the substances involved in the reaction, but also permits the elimination of water and also reduction products volatile at the temperature of the autoclave and does not necessitate decompressing and recompressing the hydrogen in the circulation.

The reduction of the carboxylic radical of an acid or fatty acid ester or glycerine to alcohol may be represented by the following equation:

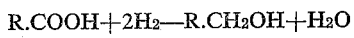

$$R.COOH + 2H_2 \rightarrow R.CH_2OH + H_2O$$

This conversion can be considered as an equilibrium reaction and therefore governed by the mass-action law. The elimination of water will therefore further the production of alcohol. When the reduction of a mixture of acids is accomplished according to the conventional procedure, the more volatile alcohols and water produced remain in the vapor phase in the reaction autoclave and produce a partial vapor pressure which dimenishes the hydrogen pressure. This is a disadvantage, for the reaction is slowed up.

A valuable embodiment of the present invention applicable to the treatment of organic substances leading to the production of reaction products of mixed volatility involves the use of heat and hydrogen pressure conditions adapted to vaporize the more volatile reaction products and the conduction of hydrogen into and through the liquid reacting mass in such a manner as to agitate the mass and assist in the removal of the vapors of the more volatile reduction products and also water vapors if the same be formed, while leaving the bulk of the reacting mass in the liquid phase.

The removal of the water of reaction and the volatile products of the reaction causes the equilibrium to be displaced and to shift toward the formation of alcohols or other hydrogenation products being produced and the reaction proceeds at a more rapid rate.

Another advantage of this procedure is that the alcohol mixture which is produced is at once fractionated by this distillation or removal of volatile constituents and water in the hydrogen stream. The heavier fraction of alcohols of high molecular weight flowed in liquid phase from the autoclave may for some purposes be used directly without further fractionation.

It is a feature of the present apparatus and system that a large excess of hydrogen under the desired hydrogenation pressure is circulated through the fatty material undergoing hydrogenation and that means are provided for condensing and returning to the body of fatty material any higher molecular weight material entrained in the hydrogen stream at the temperature of the hydrogenation autoclave and for continuously separating the water and lower molecular weight materials volatilized at the reaction temperature from the higher molecular weight materials and continuously carrying the water and lower molecular weight materials away from the hydrogenated higher molecular weight materials which remain in the liquid phase.

Another feature of the present apparatus and process is that the large excess of hydrogen is continuously recirculated through the hydrogenation autoclave under constantly maintained hydrogenation pressure and that the heavier ends are automatically stripped from the hydrogen stream and returned to the main body of the liquid material hydrogenated and that water and lighter ends are then condensed and stripped from the hydrogen stream and the hydrogen stream recirculated through the liquid reacting mass in the hydrogenation autoclave without the necessity for decompressing and recompressing the circulating hydrogen.

The system of the present invention may be applied in various forms of apparatus of which three forms are illustrated in the accompanying drawing in which—

Various other modifications and adaptations of our apparatus and system will be apparent as this description proceeds.

The present invention may be effectively carried out in an apparatus system including three or more autoclaves or pressure vessels, the first of which is for carrying out the reaction at elevated temperatures and the other two of which serve for the removal of the reaction products from said first autoclave while the said vessel is maintained under hydrogen pressure. One autoclave is for the removal of the lighter alcohols, water or other more volatile reaction products and it is connected in a circuit for recycling hydrogen gases, the said circuit including a condenser serving to liquefy the said more volatile constituents and water, thereby leaving free hydrogen gas for return to the reaction autoclave. The circuit for the return of the separated hydrogen includes a pump for forcing the hydrogen through the system, and a heater for raising the temperature of the hydrogen to a desired level or to that employed in the reaction autoclave.

The fatty material undergoing hydrogenation may be flowed batchwise into and out of the hydrogenation autoclave or may be flowed continuously through the hydrogenation autoclave and two or more hydrogenation autoclaves may be used if desired or necessary to complete the hydrogenation reaction in the most economical manner.

Figure 3:
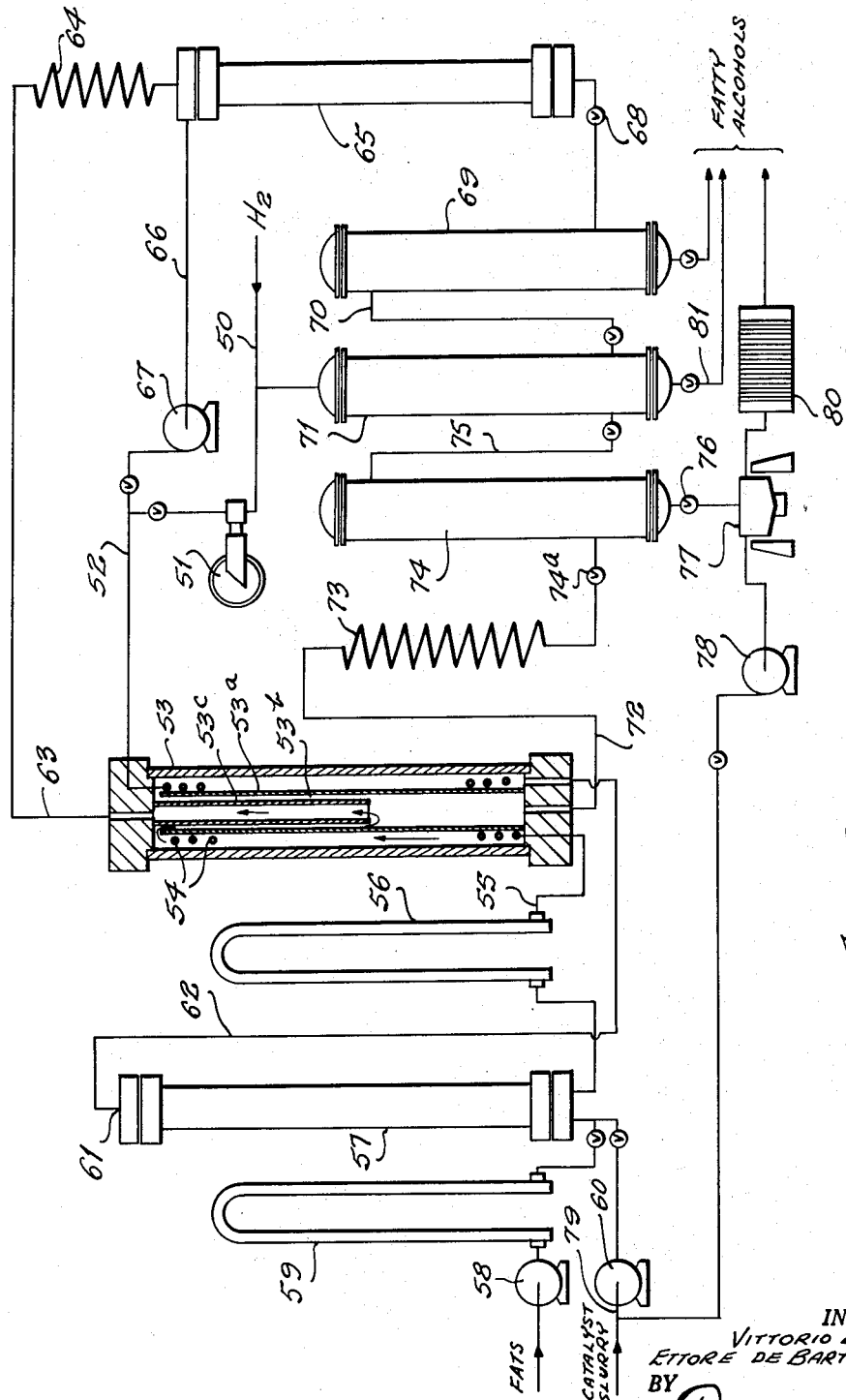
Fig. 3 is a diagrammatic illustration of a further modification of our apparatus and system adapted for continuous hydrogenation.

A deflegmator is preferably mounted on the top of the reaction autoclave in order to fractionate the alcohols or other reaction products vaporized during the reduction reaction, the condensed portion of which flows back into the reacting mass in the reaction autoclave, or a separate deflegmator or heat exchange separator, as illustrated in Fig. 3, may be used to strip and return the higher molecular reaction products to the reaction mass.

Connected to the reaction autoclave there is an inlet conduit for introducing the raw material to be reduced in a hot condition ready, or substantially ready, for immediate reaction with the hydrogen in the presence of the catalyst.

The third autoclave serves to receive the hydrogenation products from the hydrogenation autoclave without reduction in pressure in the hydrogenation autoclave and to discharge the hydrogenation products eventually to the atmospheric pressure.

Hereinafter the process is described with reference to the reduction of a mixture of fatty acids obtained by splitting coconut oil. This same procedure, however, can be used in any hydrogenation process or in any process involving reactions of hydrogen and other gases with liquids at high pressure and temperature, or in any hydrogenation process in which the elimination of water and products in vapor form displaces the reaction in the desired direction.

The mixture of coconut oil fatty acids is treated at a hydrogen pressure of about 200 atmospheres, at a temperature of about 300° C. in the presence of a catalyst such as Cu—Cr bases or any suitable copper containing catalyst. By circulating the hydrogen, under the conditions described above, the acids are not only completely reduced but the mixture of alcohols obtained, having 6 to 18 atoms of carbon, is fractionated by the removal of the lower molecular alcohols in the hydrogen stream, leaving the heavier alcohols in the reaction autoclave or the heat exchange separator.

Figure 1:
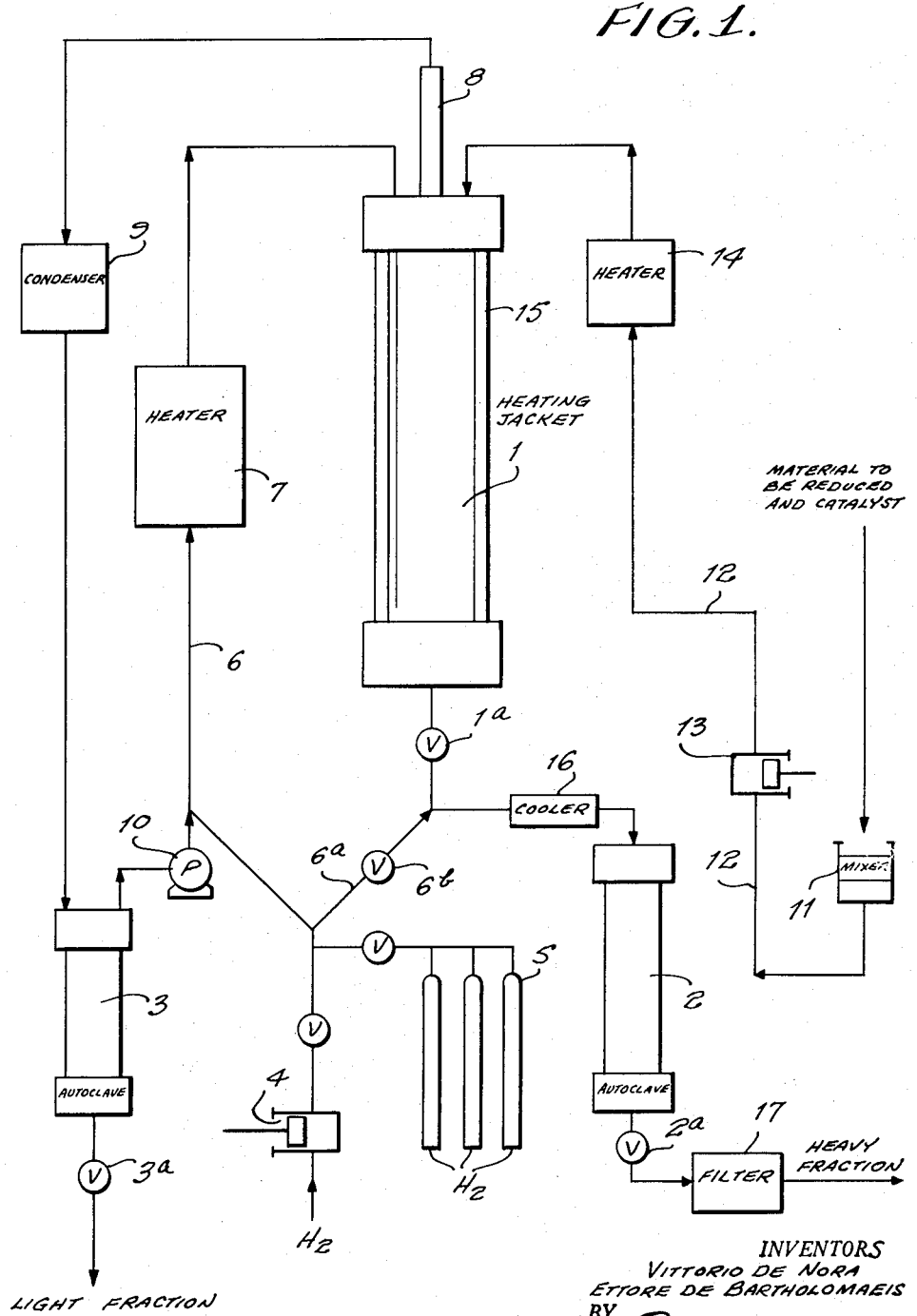
Fig. 1 is a diagrammatic illustration of the form of apparatus illustrated in our said copending application adapted for semi-continuous hydrogenation.

In Fig. 1 there are shown three autoclaves; the reaction autoclave 1, the discharge autoclave 2 for receiving the heavier reduction products, and the autoclave 3 for the collection of the more volatile reduction products and the water of reaction if any.

The hydrogen or hydrogen containing gas is introduced into the system by means of a compressor 4 or by means of one or more hydrogen storage tanks or bottles 5. This gas flows through the conduit 6, through the heater 7 and into the reaction autoclave 1 where it is discharged substantially at the bottom thereof. The resulting bubbling causes agitation of the liquid reaction mass and causes more uniform and thorough contact between the reactants. The hydrogen in the conduit 6 is maintained under a high pressure as from 20 to 300 atmospheres or more and is raised to the desired reaction temperature in its passage through the heater 7.

A large excess of hydrogen over that theoretically necesary to complete the desired hydrogenation reaction is circulated through the fatty material undergoing hydrogenation. Usually we prefer to circulate from 30 to 60 moles of hydrogen per mole of product to be hydrogenated. This in practice involves a ratio of hydrogen flow to liquid flow of approximately ten to forty volumes of hydrogen to one volume of liquid at the temperature and pressure existing in the autoclave. With a high circulation rate of the hydrogen with reference to the fatty material, it is possible to hydrogenate coconut oils or coconut oil fatty acids to the corresponding alcohols using temperatures of the order of 300° to 330° C. and pressures of about 200 atmospheres.

The part of the hydrogen gas not absorbed in the reaction mass in the autoclave, in admixture with volatilized constituents of the reaction mass and water vapor, flows out of the top of the autoclave into the dephlegmator 8 from whence the hydrogen, the lighter portion of the volatilized constituents and the water vapor flow to the condenser 9 wherein the said vapors are cooled to a temperature at which the water and the lighter alcohols or other volatile constituents are cooled and liquefied. Since the heavier portion of the volatilized constituents condense in the dephlegmator and flow downwardly and back into the liquid mass, the dephlegmator may be referred to as a "rectifying dephlegmator." The condensed liquids together with the hydrogen flow from the condenser 9 to the discharge autoclave or overheads receiver 3 wherein the liquids settle to the bottom and from which the hydrogen flows out of the top through the line 6 to the pump 10 from whence it is again introduced into the line leading to the heater 7 and to the main reaction autoclave 1.

Inasmuch as the hydrogen in the entire hydrogen circuit is maintained at a constant reactant pressure, the pump 10 operates to keep the hydrogen in circulation at a balanced pressure and needs only overcome the resistance in the line 6 and rest of the system.

As it is not necessary to decompress and recompress the hydrogen in our apparatus and system in order to separate the lighter materials and water therefrom, the large volume of hydrogen we use can be economically recirculated through the system with all the attendant advantages of high rate of hydrogen flow and a high rate of hydrogenation.

Periodically the valve 3a in the line leading from the autoclave 3 is opened to discharge the condensate which has collected in the autoclave 3 and when hydrogen begins to flow from the line, the valve 3a is closed. As the volume of the condensate is not very large, the discharge of the condensate does not materially lower the hydrogen or other gas pressure in the line 6 and whatever lowering of pressure takes place is immediately made up by the hydrogen coming in under pressure from the compressor 4 or the storage bottles 5.

The fatty acids or other liquids undergoing hydrogenation are mixed with the desired catalyst in the catalyst mixer 11 which is preferably a homogenizing colloid mill, and pumped into the line 12 by an injector pump 13 having sufficient pressure to overcome the hydrogenation pressure. From the pump 13 the liquid containing the catalyst flows into and through a heater 14 where it is heated to the desired reaction temperature and from which it flows into the reaction autoclave 1. When using a semi-continuous operation, the pump 13 is preferably of a proportioning type so that a certain number of revolutions or minutes of operation will fill the autoclave to the desired height although any suitable measurement of the degree of filling of the autoclave may be used.

When the autoclave 1 has been filled to the desired height further introduction of liquid material is stopped and the hydrogen or gas circulation through the autoclave is continued until the reaction is completed. The autoclave 1 is maintained at the desired reaction temperature at all times by a suitable resistance or other type of heater or heating jacket 15, and may be surrounded by an insulating jacket to prevent heat losses.

During the hydrogenation reaction any of the heavier volatile products which may be carried out of the autoclave 1 by the gas stream will be condensed in the dephlegmator 8 and returned to the autoclave 1.

When the reaction is completed the valve 1a at the base of the autoclave 1 is opened and the reaction products are discharge through the cooler 16 into the discharge autoclave 2. When the autoclave 1 has been discharged the valve 1a is closed and a new charge pumped into the autoclave 1.

To discharge the reaction product from the autoclave 2 the valve 6b in the hydrogen line 6a is closed, the valve 2a at the bottom of the autoclave is opened and the liquid is allowed to flow out. As soon as the liquid has been discharged from the autoclave 2, the valve 2a is closed.

From the discharge autoclave 2 the discharged reaction products flow to a filter 17 where the reaction products are separated from the catalyst.

Figure 2:
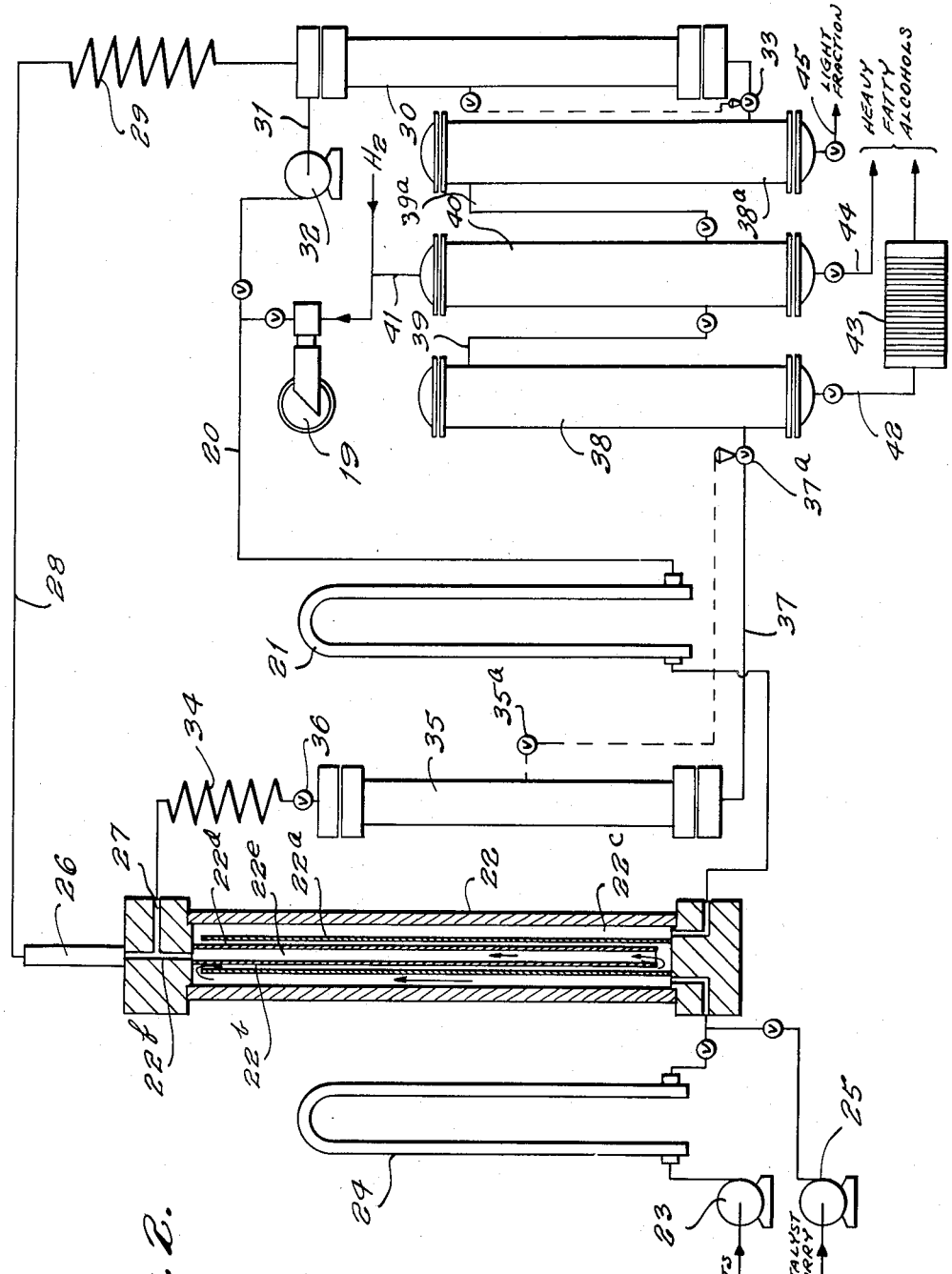
Fig. 2 is a diagrammatic illustration of a modification of the apparatus and system of Fig. 1 adapted for continuous operation.

In the system and apparatus illustrated in Fig. 2 the hydrogen or hydrogen containing gas is introduced into the system at the desired hydrogenation pressure and maintained at this pressure by means of a compressor 19 and flows through the conduit 20 and the heater 21 into the bottom of the reaction autoclave 22. The autoclave 22 is preferably provided with concentric tubes 22a and 22b on the interior thereof which provide a long and constricted passage for the flow of the hydrogen and fatty material through the autoclave.

The fatty material is introduced from any suitable source by the pump 23 which operates at sufficient pressure to overcome the hydrogen pressure of the system. From the pump 23 the fatty material flows through a heater 24 and into the bottom of the autoclave 22. The catalyst, mixed in a suitable slurry of fatty material or previously produced alcohol, is pumped by the pump 25 into the fatty material just prior to the introduction of the fatty material into the bottom of the autoclave 22. The fatty material catalyst and hydrogen enter the outer passage 22c of the autoclave 22, flow upward to the top of the autoclave and then downward through the intermediate passage 22d to the bottom of the inner tube 22b which projects approximately to the bottom of the autoclave 22 and then flow upward through the inner passage 22e to the outlet 22f at the top of autoclave 22.

While only two concentric tubes have been illustrated in autoclave 22, it will be understood that a larger number of concentric tubes providing for a tortuous flow of materials through the autoclave may be provided.

At the top of the autoclave 22 the hydrogen gas, carrying water and lighter materials vaporized at the temperature of the autoclave, flows into a deflegmator column 26. In the deflegmator column 26 the materials flowing therethrough are cooled and any entrained liquid and vapors which condense at approximately the temperature of the autoclave are stripped out of the hydrogen stream and flow back from the rectifying deflegmator 26 into the top of the autoclave 22 where they flow out with the hydrogenated liquid material from the passage 27.

The remainder of the hydrogen gas stream flowing through the deflegmator 26 carries any water formed in the reaction and alcohols which volatilize at a temperature below the reaction temperature in the autoclave 22. This material flows through the line 28 to condenser 29 in which the lighter portions of the volatilized constituents and the water vapor are condensed to liquid.

From the condenser 29 the materials flow into an overheads discharge autoclave 30 where the hydrogen separates from the condensed liquids and flows through the line 31 to a pump 32 by which it is again recirculated through the hydrogen circuit. Inasmuch as the hydrogen in the entire hydrogenation circuit is maintained at constant reactant pressure by the compressor 19, the pump 32 operates to keep the hydrogen in circulation at a balanced pressure and needs only overcome the resistance in the hydrogen lines and the rest of the system. The hydrogen is not decompressed and recompressed in this circuit and except for the normal pressure drop in passing through the hydrogen circuit, it is maintained substantially at the hydrogenation pressure.

While the condensed liquids in the overheads discharge autoclave 30 may be periodically discharged therefrom through a manually controlled valve similar to the valve 3a of the embodiment of Fig. 1, they are preferably continuously discharged from this autoclave through a floating type solenoid or motor controlled valve 33 controlled by a level controller 33a which causes the size of the passage through the valve 33 to increase or decrease as the level of liquid in the overheads discharge autoclave 30 rises and falls. As the volume of liquids condensed in the overheads condenser 30 is small with reference to the volume of hydrogen in the circuit, the hydrogen pressure is maintained substantially constant in the hydrogen circuit in spite of the constant discharge of liquids from the overheads discharge autoclave 30, and whatever reduction in pressure takes place is immediately restored by the hydrogen compressor 19 pumping fresh hydrogen from the hydrogen supply into the hydrogen circuit at the desired pressure.

From the overheads discharge autoclave 30 the water and lighter alcohol fraction flow through the valve 33 into a decompressor tank 38a and from the top of the decompressor tank 38a any hydrogen separating from the liquids flows through the line 39a to the hydrogen vent tank 40 and from the top of the tank 40 through the hydrogen line 41 back to the hydrogen storage or to the compressor 19. The liquid material from the decompressor tank 38a may be discharged through the line 45 to storage tanks (not shown) and the water and lighter alcohols recovered.

From the liquids discharge outlet 27 of the autoclave 22 the hydrogenated liquid fatty material flows through a cooler 34 into a receiver 35 for the hydrogenated fatty materials and from the bottom of the receiver 35 the hydrogenated material flows through the line 37 and valve 37a into the discharge tank 38. By proper regulation of the valve 37a with reference to the amount of fatty material pumped through the hydrogenating system, a continuous flow of fatty material may be maintained from the pump 23 through the autoclave 22 and into the decompressor tank 38. While the valve 37a may be manually controlled, it is preferably an electrically operated floating type solenoid or motor controlled valve controlled by a level controller 35a in the receiver 35 so as to increase or decrease the size of the valve opening as the level of hydrogenated material in receiver 35 rises and falls. The rate of flow maintained by the pump 23 is such as to insure the desired degree of hydrogenation of the fatty material in its passage through the autoclave 22.

The hydrogen, which separates from the hydrogenated fatty material in the discharge tank 38, flows through the line 39 into a hydrogen vent tank 40 and from the top of the tank 40 through the hydrogen line 41 back to the hydrogen storage or to the hydrogen line leading to the compressor 19.

The valve 36 may be used to control the flow of hydrogenated fatty material into the receiver autoclave 35. From the bottom of the discharge tank 38 the liquid hydrogenated material flows through the line 42 to a filter 43 or a centrifuge or any other apparatus suitable for separating the catalyst from the hydrogenated fatty material.

Any liquid material which condenses out of the hydrogen in the hydrogen vent tank 40 may be discharged through the line 44 to the storage tanks (not shown) for the hydrogenated fatty material.

A heating jacket may be provided around the autoclave 22 to maintain the autoclave at the desired hydrogenating temperature.

During hydrogenation of the fatty material in the autoclave 22, the fatty material is pumped through the autoclave at the rate of approximately 1 volume of fatty material to 10 to 40 volumes of hydrogen and the autoclave is designed to retain the fatty material in the autoclave for sufficient length of time to complete the desired hydrogenation reaction. If desired, two or more hydrogenation autoclaves may be used in series.

By suitable control of the valve 37a it is possible to maintain a substantially continuous flow of materials being hydrogenated through the autoclave 22 and the receiver autoclave 35 and into the discharge tank 38.

In the form of embodiment of apparatus illustrated in Fig. 3, the hydrogen is introduced into the hydrogenating circuit from a suitable storage source through the line 50 and is compressed by the compressor 51 to maintain the desired pressure in the hydrogenating system. From the compressor 51 the hydrogen flows through the line 52 and through a heat exchange rectifying deflegmator 53 where the hydrogen flows through a heat exchange coil 54 where it is heated and the materials in the deflegmator column 53 are cooled. From the bottom of the coil 54 the hydrogen flows through the line 55 to a hydrogen heater 56 and from the hydrogen heater 56 into the bottom of the autoclave 57.

The fatty material undergoing hydrogenation is pumped by the pump 58 through the heater 59 into the bottom of the autoclave 57 and the catalyst, mixed with fatty material or alcohol, is pumped in a slurry form by the pump 60 into the fatty material just as the fatty material enters the bottom of the autoclave 57.

The autoclave 57 is preferably provided with concentric tubes similar to the tubes 22a and 22b of the autoclave 22 and the hydrogen, catalyst and fatty material flow from the bottom of the autoclave 57 to the top thereof through the outer passage surrounding the outer concentric tube, then downward through the intermediate passage between the tubes and up through the center passage to the outlet 61. From the outlet 61 the hydrogenated fatty material, hydrogen, catalyst and water and other materials volatilized in the autoclave 57 flow continuously through the line 62 into the bottom of the deflegmator separator 53. In the deflegmator 53 the hydrogenated fatty materials flow upward around the tube 53a and are cooled by the hydrogen flowing through the coil 54. At the top of the tube 53a the hydrogenated fatty material flows downward through the space 53b between the outer and inner concentric tubes 53a and 53c and near the bottom of the inner tube 53c the hydrogen, water and other volatile products separate from the liquid hydrogenation products and flow through the line 63 to condenser 64 where the water and lower boiling hydrogenated products are condensed and flow into condensate autoclave 65. From the top of the condensate autoclave 65 the hydrogen flows through the line 66 and the pump 67 where it is recirculated through the hydrogenation system. As the hydrogen is not decompressed, pump 67 operates against a balanced hydrogen pressure and only needs to overcome the resistance in the hydrogenating circuit.

The condensate in the condensate autoclave 65 may be flowed through the valve 68 into an overheads decompressor 69. If manually controlled, when hydrogen begins to flow from the valve 68 or the hydrogen pressure in the system as indicated by the control instruments begins to fall, the valve 68 is closed. Any hydrogen which escapes into the overheads decompressor 69 or which separates from the overheads condensate flows through the line 70 into a hydrogen recovery tank 71 and from there back into the hydrogen line 50 leading to the compressor 51. If desired the valve 68 may be automatically controlled by a liquid level controller in the condensate autoclave 65 to permit continuous discharge of condensate from the autoclave.

The hydrogenated fatty liquid material in the deflegmator 53 flows from the bottom of the deflegmator 53 through the line 72 and through the cooler 73 and valve 74a, which may be manually or automatically controlled, into the hydrogenated materials discharge tank 74. From the top of the discharge tank 74 hydrogen may flow through the line 75 into the hydrogen recovery tank 71 and the liquid hydrogenated material may be discharged through the valve 76 to a centrifuge 77 where the catalyst is removed from the hydrogenated material and reslurried and pumped by pump 78 back to the catalyst inlet 79 leading to the pump 60. The hydrogenated material then flows to a filter 80 from which the filtered hydrogenated material may be discharged to the fatty alcohol storage. Fatty material collecting in the bottom of hydrogen recovery tank 71 may be periodically discharged through the line 81 to storage.

In this embodiment of our invention the fatty material from the pump 58 may be pumped in heat exchange relation with the heated hydrogenated material flowing through the heat exchanger 73 or it may be flowed through the coil 54 of the heat exchange separator 53 in place of the hydrogen.

By suitable regulation of the pumping rate of pump 58 and of the flow control valves, such as valve 74a, a continuous flow of fatty material may be maintained from the pump 58 to the discharge tank 74 and by correlating the rate of flow of fatty material through the autoclave 57 and the flow of hydrogen therethrough, continuous hydrogenation may be effected. The valve 74a may be automatically controlled by a liquid level controller in the heat exchange separator 53 to maintain the desired liquid level therein. If desired, two or more hydrogenation autoclaves 57 may be connected in series or the single autoclave 57 may be lengthened to insure proper retention time in the hydrogenation autoclave of the material being hydrogenated.

While our system and apparatus has been illustrated in diagrammatic form, it will be obvious that certain modifications and changes may be made therein without departing from the spirit of our invention or the scope of the following claims.

We claim:

1. An apparatus for the hydrogenation, under high pressure and temperature, of organic raw materials under high pressure and temperature which produce mixed hydrogenation products of differing boiling points comprising, a reaction autoclave, a condensate autoclave for collecting the vaporized reaction products and a discharge autoclave for the liquid reaction products connected by a conduit to said reaction autoclave, an organic raw materials conduit having a heater therein connected to the said reaction autoclave for introducing organic raw materials into said reaction autoclave, a hydrogen conduit connecting said reaction autoclave with a source of hydrogen, a conduit connecting said reaction autoclave with said condensate autoclave and a return conduit connecting said condensate autoclave with said reaction autoclave forming a hydrogen circuit from said reaction autoclave to said condensate autoclave and back to said reaction autoclave and means in said circuit capable of circulating hydrogen in excess of the amount required for hydrogenation of said organic raw materials through said hydrogen circuit, a condensing means adjacent the reaction autoclave mounted in the conduit leading from said reaction autoclave to the condensate autoclave whereby the higher boiling hydrogenation products are condensed and separated from the hydrogen stream passing out of the reaction autoclave, a cooler in the conduit leading from said condensing means to the condensate autoclave whereby the lower boiling fractions left in said hydrogen stream are condensed and discharged into said condensate autoclave, a heater in the conduit from the condensate autoclave to the reaction autoclave to heat the hydrogen passing therethrough and means in said hydrogen circuit to maintain the hydrogen therein and said reaction autoclave and said condensate autoclave constantly at substantially the hydrogenation pressure.

2. An apparatus for the hydrogenation, under high pressure and temperature, of organic raw materials containing carboxyl groups under high pressure and temperature in the presence of a catalyst which produce mixed hydrogenation products of differing boiling points comprising a reaction autoclave, a condensate autoclave for the vaporized reaction products and a discharge autoclave for the liquid reaction products, an organic raw materials conduit having a heater therein connected to the said reaction autoclave for introducing organic raw materials into said reaction autoclave, a hydrogen conduit connecting said reaction autoclave with a source of hydrogen, a conduit connecting said reaction autoclave with said condensate autoclave and a return conduit connecting said condensate autoclave with said reaction autoclave forming a hydrogen circuit from said reaction autoclave to said consensate autoclave and back to said reaction autoclave and means in said circuit to circulate hydrogen in excess of the amount required for hydrogenation of said organic raw materials through said circuit, a fractionating dephlegmator adjacent the reaction autoclave in the conduit leading from said reaction autoclave to the condensate autoclave to condense and separate the higher boiling hydrogenation products from the hydrogen stream, a cooler in said conduit from the reaction autoclave to the condensate autoclave to consense the lower boiling hydrogenation products produced in said reaction autoclave, a heater in the conduit from the condensate autoclave to the reaction autoclave to heat the hydrogen passing therethrough, a means in said return hydrogen circuit to maintain the hydrogen in said hydrogen circuit and said reaction autoclave and said condensate autoclave constantly at the hydrogenation pressure, a conduit for the liquid hydrogenated material connecting the reaction autoclave to the discharge autoclave, a cooler in said last mentioned conduit, means in said organic raw materials conduit to pump said organic raw materials to said reaction autoclave at the hydrogenation pressure.

3. In a high pressure hydrogenation system for the reduction by hydrogenation under high pressure and temperature of the carboxylic radical of organic raw materials of high molecular weight which produce mixed hydrogenation products of different boiling points, a reaction autoclave, a condensate autoclave for collecting the vaporized reaction products, and a discharge autoclave for the liquid reaction products, hydrogen conduits forming a circuit passing through the reaction autoclave to the condensate autoclave and back to the reaction autoclave, means connected to said hydrogen circuit to introduce hydrogen into said circuit at hydrogenation pressure and to maintain the hydrogen in said circuit at hydrogenation pressure, means in said hydrogen circuit capable of circulating the hydrogen through said reaction autoclave and hydrogen circuit in excess of the amount required for hydrogenation of said organic raw material, means connected to said reaction autoclave to introduce liquid organic raw material and catalyst into said reaction autoclave at hydrogenation pressure, condensing means mounted in said hydrogen circuit leading from the reaction autoclave whereby the higher boiling products carried out of the reaction autoclave in and by the hydrogen stream are condensed and separated from the hydrogen stream, means in said hydrogen conduit at a point between the said condensing means and the condensate autoclave for condensing the lower boiling products from said hydrogen stream and for discharging said lower boiling products into said condensate autoclave without material reduction of the hydrogenation pressure, means in said hydrogen conduit from the condensate autoclave to the reaction autoclave to heat the hydrogen stream, a conduit for the hydrogenated higher boiling liquid reaction products from the reaction autoclave to the discharge autoclave, a cooler in said last mentioned conduit and valve means in said latter conduit to maintain the liquid reaction products under hydrogenation pressure.

4. An apparatus for the hydrogenation, under high pressure and temperature, of fatty materials under high pressure and temperature which produces mixed hydrogenation products of differing boiling points comprising a reaction autoclave, a condensate autoclave for the vaporized reaction products and a discharge autoclave for the liquid reaction products connected by a conduit to said reaction autoclave, a fatty material conduit having a heater therein connected to the said reaction autoclave for introducing fatty material, a hydrogen conduit connecting said reaction autoclave with a source of hydrogen, a conduit connecting said reaction autoclave with said condensate autoclave and a return conduit connecting said condensate autoclave with said reaction autoclave forming a hydrogen circuit from said reaction autoclave to said condensate autoclave and back to said reaction autoclave and means in said circuit to circulate hydrogen through said circuit, a fractionating dephlegmator adjacent the reaction autoclave in the conduit leading from said reaction autoclave to the condensate autoclave, a cooler in said conduit from the reaction autoclave to the condensate autoclave to condense the vaporized fraction produced in said reaction autoclave, a heater in the conduit from the condensate autoclave to the reaction autoclave to heat the hydrogen passing therethrough and means in said return hydrogen conduit to maintain the hydrogen therein and said reaction autoclave and said condensate autoclave constantly at substantially the hydrogenation pressure.

5. The apparatus defined in claim 4 wherein the fractionating dephlegmator is mounted at a higher level than the reaction autoclave such that the condensate and any entrained liquid separated in the dephlegmator can flow back into the reaction autoclave.

6. An apparatus for the hydrogenation, under high pressure and temperature, of fatty materials under high pressure and temperature which produces mixed hydrogenation products of differing boiling points comprising a reaction autoclave, a condensate autoclave for the vaporized reaction products and a discharge autoclave for the liquid reaction products, a fatty material conduit having a heater therein connected to the said reaction autoclave for introducing fatty material, a hydrogen conduit connecting said reaction autoclave with a source of hydrogen, a conduit connecting said reaction autoclave with said condensate autoclave and a return conduit connecting said condensate autoclave with said reaction autoclave forming a hydrogen circuit from said reaction autoclave to said condensate autoclave and back to said reaction autoclave and means in said circuit to circulate hydrogen through said circuit, a fractionating dephlegmator adjacent the reaction autoclave in the conduit leading from said reaction autoclave to the condensate autoclave, a cooler in said conduit from the reaction autoclave to the condensate autoclave to condense the vaporized fraction produced in said reaction autoclave, a heater in the conduit from the condensate autoclave to the reaction autoclave to heat the hydrogen passing therethrough, a means in said return hydrogen circuit to maintain the hydrogen in said hydrogen circuit and said reaction autoclave and said condensate autoclave constantly at the hydrogenation pressure, a conduit for the liquid hydrogenated material connecting the reaction autoclave to the discharge autoclave, and means in said fatty material conduit to pump the fatty material to said reaction autoclave at the hydrogenation pressure.

References Cited in the file of this patent

UNITED STATES PATENTS

| | | |
|---|---|---|
| 1,079,278 | Wilbuschewitsch | Nov. 18, 1913 |
| 1,353,419 | Radisson et al. | Sept. 21, 1920 |
| 2,340,691 | Richardson et al. | Feb. 1, 1944 |
| 2,520,424 | Mills et al. | Aug. 29, 1950 |
| 2,582,899 | Barnebey et al. | Jan. 15, 1952 |